US005784057A

United States Patent [19]
Alimpich et al.

[11] Patent Number: 5,784,057
[45] Date of Patent: Jul. 21, 1998

[54] DYNAMICALLY MODIFYING A GRAPHICAL USER INTERFACE WINDOW TITLE

[75] Inventors: Claudia C. Alimpich, Boulder; Gerald D. Boldt; Calvin Larry Doescher, both of Longmont; Joan Stagaman Goddard; James Philip Wittig, both of Boulder, all of Colo.

[73] Assignee: International Business Machines Corporation, Armonk, N.Y.

[21] Appl. No.: 696,746

[22] Filed: Aug. 14, 1996

[51] Int. Cl.$^6$ ............................................. G06F 15/00
[52] U.S. Cl. ...................... 345/339; 345/340; 345/348
[58] Field of Search ................................ 345/326, 327, 345/328, 329, 330, 331, 332, 333, 334, 339, 340, 342, 343, 348, 349, 350, 351, 352, 353, 354, 357

[56] References Cited

U.S. PATENT DOCUMENTS

| 4,464,652 | 8/1984 | Lapson et al. | 345/165 |
| 5,001,654 | 3/1991 | Winiger et al. | 707/529 |
| 5,062,060 | 10/1991 | Kolnick | 345/339 |

(List continued on next page.)

FOREIGN PATENT DOCUMENTS

| 2097540 | 12/1994 | Canada . |
| 0 587 394 A1 | 3/1994 | European Pat. Off. . |
| 0 622 728 A1 | 11/1994 | European Pat. Off. . |
| 4-361373 | 12/1992 | Japan . |
| 5-313845 | 11/1993 | Japan . |
| 6-4117 | 1/1994 | Japan . |
| 6-215095 | 8/1994 | Japan . |
| 7-129597 | 5/1995 | Japan . |

OTHER PUBLICATIONS

"Device Independent Graphics Using Dynamic Generic Operator Selection," *IBM Technical Disclosure Bulletin*, Apr. 1983, vol. 25, No. 11A, pp. 5477–5480.

"Error–Tolerant Dynamic Allocation of Command Processing Work Space." *IBM Technical Disclosure Bulletin*, Jun. 1984, vol. 27, No. 1B, pp. 584–586.

"Means for Computing the Max of a Set of Variables Distributed Across Many Processors," *IBM Technical Disclosure Bulletin*, Sep. 1990, vol. 33, No. 4, pp. 8–12.

"Graphical User Interface for the Distributed System Namespace," *IBM Technical Disclosure Bulletin*, Jul. 1992, vol. 35, No. 2, pp. 335–336.

"Graphical Query System," *IBM Technical Disclosure Bulletin*, Nov. 1993, vol. 36, No. 11, pp. 615–616.

"Configuration Data Set Build Batch Program." *IBM Technical Disclosure Bulletin*, Nov. 1993, vol. 36, No. 11, pp. 571.

Self–Contained Reusable Programmed Components. *IBM Technical Disclosure Bulletin*, Jul. 1995, vol. 38, No. 7, pp. 283–285.

(List continued on next page.)

Primary Examiner—Matthew M. Kim
Assistant Examiner—Huynh Ba
Attorney, Agent, or Firm—Jenkens & Gilchrist; Michele A. Mobley

[57] ABSTRACT

An application, method and apparatus for revision of a title of a window containing objects as controlled by a computer system. The computer system has at least a visual operator interface, an operating system for operating applications within the computer system, and memory for storing the application therein. A title is generated for the window containing a list of all of the parent objects, either in the window or represented by child objects in the window. The title is revised dynamically to correspond with modifications in the parent objects. The title revision is done while the window is displayed. Also a means for retaining in the title the name of a parent object even if the parent object becomes temporarily unavailable while the window is displayed. Also a means for saving the revised title so that when the window is opened again in the future, the objects are displayed. Additionally a means for closing the window if all of the objects are deleted.

22 Claims, 10 Drawing Sheets

U.S. PATENT DOCUMENTS

| | | | |
|---|---|---|---|
| 5,072,412 | 12/1991 | Henderson | 345/346 |
| 5,095,512 | 3/1992 | Roberts et al. | 382/245 |
| 5,117,372 | 5/1992 | Petty | 345/335 |
| 5,119,476 | 6/1992 | Texier | 345/347 |
| 5,121,477 | 6/1992 | Koopmans et al. | 345/333 |
| 5,140,677 | 8/1992 | Fleming et al. | 345/348 |
| 5,140,678 | 8/1992 | Torres | 345/350 |
| 5,164,911 | 11/1992 | Juran et al. | 364/578 |
| 5,206,950 | 4/1993 | Geary et al. | 395/702 |
| 5,208,907 | 5/1993 | Shelton et al. | 707/505 |
| 5,228,123 | 7/1993 | Heckel | 345/334 |
| 5,233,687 | 8/1993 | Henderson et al. | 345/346 |
| 5,247,651 | 9/1993 | Clarisse et al. | 395/500 |
| 5,249,265 | 9/1993 | Liang | 345/356 |
| 5,255,359 | 10/1993 | Ebbers et al. | 345/433 |
| 5,276,901 | 1/1994 | Howell et al. | 464/11 |
| 5,287,447 | 2/1994 | Miller et al. | 345/342 |
| 5,307,451 | 4/1994 | Clark | 345/427 |
| 5,315,703 | 5/1994 | Matheny et al. | 345/507 |
| 5,317,687 | 5/1994 | Torres | 345/349 |
| 5,317,730 | 5/1994 | Moore et al. | 707/100 |
| 5,367,619 | 11/1994 | Dipaolo et al. | 707/506 |
| 5,371,844 | 12/1994 | Andrew et al. | 345/334 |
| 5,377,317 | 12/1994 | Bates et al. | 345/342 |
| 5,388,255 | 2/1995 | Pytlik et al. | 707/4 |
| 5,394,521 | 2/1995 | Henderson et al. | 345/346 |
| 5,404,439 | 4/1995 | Moran et al. | 345/326 |
| 5,410,695 | 4/1995 | Frey et al. | 395/680 |
| 5,410,704 | 4/1995 | Norden-Paul et al. | 395/671 |
| 5,412,776 | 5/1995 | Bloomfield et al. | 345/346 |
| 5,414,806 | 5/1995 | Richards | 345/435 |
| 5,416,900 | 5/1995 | Blanchard et al. | 345/346 |
| 5,418,950 | 5/1995 | Li et al. | 707/4 |
| 5,428,554 | 6/1995 | Laskoski | 364/550 |
| 5,428,776 | 6/1995 | Rothfield | 707/4 |
| 5,438,659 | 8/1995 | Notess et al. | 345/335 |
| 5,450,545 | 9/1995 | Martin et al. | 395/701 |
| 5,454,071 | 9/1995 | Siverbrook et al. | 345/441 |
| 5,454,106 | 9/1995 | Burns et al. | 707/4 |
| 5,459,825 | 10/1995 | Anderson et al. | 345/433 |
| 5,459,832 | 10/1995 | Wolf et al. | 345/342 |
| 5,463,724 | 10/1995 | Anderson et al. | 707/503 |
| 5,473,745 | 12/1995 | Berry et al. | 345/340 |
| 5,479,599 | 12/1995 | Rockwell et al. | 345/349 |
| 5,481,666 | 1/1996 | Nguyen et al. | 345/357 |
| 5,483,651 | 1/1996 | Adams et al. | 707/1 |
| 5,487,141 | 1/1996 | Cain et al. | 345/435 |
| 5,491,795 | 2/1996 | Beaudet et al. | 345/345 |
| 5,497,454 | 3/1996 | Bates et al. | 345/344 |
| 5,497,484 | 3/1996 | Potter et al. | 707/200 |

OTHER PUBLICATIONS

"IBM Printing Systems Manager for AIX Overview," *International Business Machines Corporation*, Second Edition, Feb. 1996.

"IBM Printing Systems Manager for AIX Administrating," *International Business Machines Corporation*, 1995.

"Matching Three–Dimensional Objects Using a Relational Paradigm," *Pattern Recognition*, vol. 17, No. 4, pp. 385–405, 1984.

"A Multicolumn List–Box Container for OS/2," *Dr. Dobb's*, May 1994, vol. 19, No. 5, pp. 90–94.

| FIG. 7A |
|---|
| FIG. 7B |
| FIG. 7C |
| FIG. 7D |

STEP 1
OPEN TOP-WINDOW

| USER ACTIONS | SYSTEM ACTIONS |
|---|---|
| User opens Top-Window | → - Get Window-Name for the Top-Window |
| | - Get names of Window-Objects from application persistent data |
| | - Construct Window-Title string for Top-Window from Window-Name appended by names of Window-Objects separated by blanks |
| | - Add Window-Title string to Top-Window |

STEP 2 ALTERNATIVE 1
DELETE OBJECT FROM TOP-WINDOW

| USER ACTIONS | SYSTEM ACTIONS |
|---|---|
| User selects and deletes an object from the Top-Window | → - Remove object name from application persistent data |
| | - Get Window-Name for the Top-Window |
| | - Get names of Window-Objects from application persistent data |
| | - Construct Window-Title string for Top-Window from Window-Name appended by names of Window-Objects separated by blanks |

STEP 2 ALTERNATIVE 4B
DELETE OBJECT FROM PARENT-WINDOW

| USER ACTIONS | SYSTEM ACTIONS |
|---|---|
| User selects and deletes objects from Parent-Window that is not a Top-Window | - Get Window-Name for Child-Window(s)<br>- Delete names of deleted object(s) from Window-Object list of Child-Window(s)<br>- Construct Window-Title string for Child-Window(s) from Window-Name appended by names of Window-Objects separated by blanks<br>- Replace Window-Title string in Child-Window(s) |

STEP 2 ALTERNATIVE 5
ADD OBJECT TO PARENT-WINDOW

| USER ACTIONS | SYSTEM ACTIONS |
|---|---|
| User creates a new object in Parent-Window that is not a Top-Window | - Window-Title in Child-Window is unchanged |

STEP 2 ALTERNATIVE 6
DELETE LAST OBJECT REPRESENTED IN CHILD-WINDOW

| USER ACTIONS | SYSTEM ACTIONS |
|---|---|
| User selects and deletes objects from Parent-Window and it was the last object represented in the Child-Window | - Display a message box for Child-Window |
| User responds to message box | - Close message box<br>- Child-Window closes |

DYNAMICALLY MODIFYING A GRAPHICAL USER INTERFACE WINDOW TITLE

BACKGROUND OF THE INVENTION AND STATE OF THE PRIOR ART

1. Field of the Invention

The present invention relates to graphical user interfaces ("GUI"). More particularly, the present invention relates to dynamically modifying, adding, removing (or some combination of the foregoing) a window title to correspond with changes (i.e. additions or deletions) in the objects represented in the window described by the window title.

2. Description of Related Art

In order to better understand the terms utilized in this patent application, a brief background definition section will be presented so that the reader will have a common understanding of the terms employed and associated with the present invention.

A "user interface" is a group of techniques and mechanisms that a person employs to interact with an object. The user interface is developed to fit the needs or requirements of the users who use the object. Commonly known user interfaces can include telephone push buttons or dials, or pushbuttons such as on a VCR or a television set remote. With a computer, many interfaces not only to allow the user to communicate with the computer but also allow the computer to communicate with the user. These would include (1) command-line user interfaces (i.e., user remembered commands which he/she enters, e.g. "C:\>DIR" in which "DIR" is a typical DOS command entered at the "C" prompt); (2) menu-driven user interfaces which present an organized set of choices for the user, and (3) graphical user interfaces, ("GUI") in which the user points to and interacts with elements of the interface that are visible, for example by a "mouse" controlled arrow or cursor.

An example of a GUI user interface is that which is offered by International Business Machines Corporation (IBM) under the name "Common User Access" ("CUA"). This GUI incorporates elements of object orientation (i.e., the user's focus is on objects and the concept of applications is hidden). Object orientation of the interfaces allow for an interconnection of the working environment in which each element, called an "object," can interact with every other object. The objects users require to perform their tasks and the objects used by the operating environment can work cooperatively in one seamless interface. With object oriented programming using a GUI, the boundaries that distinguish applications from operating systems are no longer apparent or relevant to the user.

In connection with this patent application, an "object" means any visual component of a user interface that a user can work with as a unit, independent of other items, to perform a task. By way of example, a spreadsheet, one cell in a spreadsheet, a bar chart, one bar in a bar chart, a report, a paragraph in a report, a database, one record in a database, and a printer are all objects. Each object can be represented by one or more graphic images, called "icons," with which a user interacts, much as a user interacts with objects in the real world. (NOTE: In the real world, an object might be an item that a person requires to perform work. As an example, an architect's objects might include a scale, T-square, a sharp pencil etc. while an accountant's objects might include a ledger and a calculator.) However, it is not required that an object always be represented by an icon, and not all interaction is accomplished by way of icons. For example, a user can interact with an object by opening a window that displays more information about the object and includes a variety of mechanisms for interacting with the object.

While classification of objects may follow many different definitions, each class of objects has a primary purpose that separates it from the other classes. A class may be looked at as a group of objects that have similar behavior and information structures. In addition, each of the objects enumerated and defined below may contain other objects. There are three primary classes of objects. Each is discussed below.

(1) Container Object: This object holds other objects. Its principal purpose is to provide the user with a way to hold or group related objects for easy access or retrieval. An operating system, e.g. OS/2® (a trademark of IBM Corporation) or Windows® (a trademark of Microsoft Corporation), typically provides a general-purpose container, for example a folder or a program group—that holds any type of object, including other containers. For example, imagine a program group (or folder) labeled "PRIVATE FOLDER - ICONS". In the program group are three folder icons labeled "REPORTS", "PORTFOLIO" and "LETTERS". By selecting with a mouse or other pointing device the icon "PORTFOLIO", another window may open showing three more icons labeled "OIL PAINTINGS", "WATERCOLORS" and "PORTRAITS". In turn, selecting any of those three icons may open additional windows with further icons representing further subdivisions, or cross-references (e.g., "CUSTOMERS").

(2) Data Objects: The principal purpose of a data object is to convey information. This information may be textual or graphical information or even audio or video information. For example, a business report displayed on the computer monitor may contain textual information concerning sales of "gadgets" over the past few years (text object) to all customers and also may contain a bar chart (graphic object) to pictorially depict, on the same monitor screen, the sales information.

(3) Device Objects: The principal purpose of a device object is to provide a communication vehicle between the computer and another physical or logical object. Many times the device object represents a physical object in the real world. For example, a mouse object or icon can represent the user's pointing device, and a modem object can represent the user's modem, or a printer object or icon can represent the user's printer. Other device objects are purely logical, e.g. an out-basket icon representing outgoing electronic mail; a wastebasket object or icon representing a way the user may "trash" or dispose of other objects.

As can be seen from the foregoing, a class of objects may be defined as a description of the common characteristics of several objects, or a template or model which represents how the objects contained in the class are structured. While there are further ways in which to define objects and class of objects, typically each class of objects will include similar attributes, the values of which the user will alter, modify, replace or remove from time to time. (For a more complete discussion of objects, attributes, object oriented interfaces etc., see "Object Oriented Interface Design: IBM Common User Access" (published by Que, ISBN 1-56529-170-0).

In most graphical user interfaces, the title of a given window contains the names of objects or entities represented in the window. Current graphical interface architectures do not provide a mechanism to facilitate changing the title to correspond to changes, such as additions or deletions, in the objects or entities represented in the window, particularly while the window is displayed.

The prior art reveals few efforts to solve the problem of "updating" the title of a window. In U.S. Pat. No. 5,497,484 to Potter, et al., updates of window titles are disclosed, but only as to single objects. Changes to multiple objects in the window are not addressed.

SUMMARY OF THE INVENTION

It is a principal object of the present invention to provide a means for dynamically updating the title of a window to correspond with changes, additions, or deletions in the objects in the window, wherein the updating occurs even while the window is displayed.

Another object of the present invention is to permit such dynamic updating of the title to apply to other related windows and to future uses of the same window.

Yet another object of the present invention is to provide a means for changing the title of a window to correspond to changes, additions, or deletions in the objects in the window even when one or more of the objects is temporarily unavailable due to system problems.

A further object of the invention is to provide a means for dynamically updating the title of a window where the title is a list of the names of objects or entities that are related to the objects or entities that appear in the window.

An application, method and apparatus is disclosed for revision of a title of a window containing objects as controlled by a computer system. The computer system has at least a visual operator interface, an operating system for operating applications within the computer system, and memory for storing the application therein. A title is generated for a given window containing a list of all of the objects in the window. Selected objects, e.g. other applications, parts of applications such as cells in a spread sheet, or real objects such as printers, are designated for modification and then are modified. The title then is revised dynamically to correspond with the modifications in the objects, even while the window is displayed. Also disclosed is a means for retaining in the title the name of an object in the window even if the object becomes temporarily unavailable while the window is displayed. Also disclosed is a means for saving the revised title so that when the window is opened in the future, the modified objects are displayed. Additionally disclosed is a means for closing the window if all of the objects are deleted.

Other objects of the invention and a more complete understanding of the invention may be had by referring to the following description taken in conjunction with the accompanying drawings.

BRIEF DESCRIPTION OF THE DRAWINGS

FIG. 7, including FIG. 7A, FIG. 7B, FIG. 7C, and FIG. 7D, is a flow chart showing the method of the present invention to dynamically update the title of a window to correspond to changes in the objects in the window.

DESCRIPTION OF THE ILLUSTRATIVE EMBODIMENT(S)

In a GUI, the title of a window may contain the names of the objects (or other entities) represented in the window. The present invention contemplates that the title will be constructed at the time the window is invoked (i.e., selected or "called up"). The title of the window is a list of the objects represented in the window.

The objects represented in the window may appear in the window together with the name of the object. Alternatively, the objects that appear in the window may belong to or be related to the objects whose names appear in the title of the window. The present invention addresses both situations.

Figure 1:
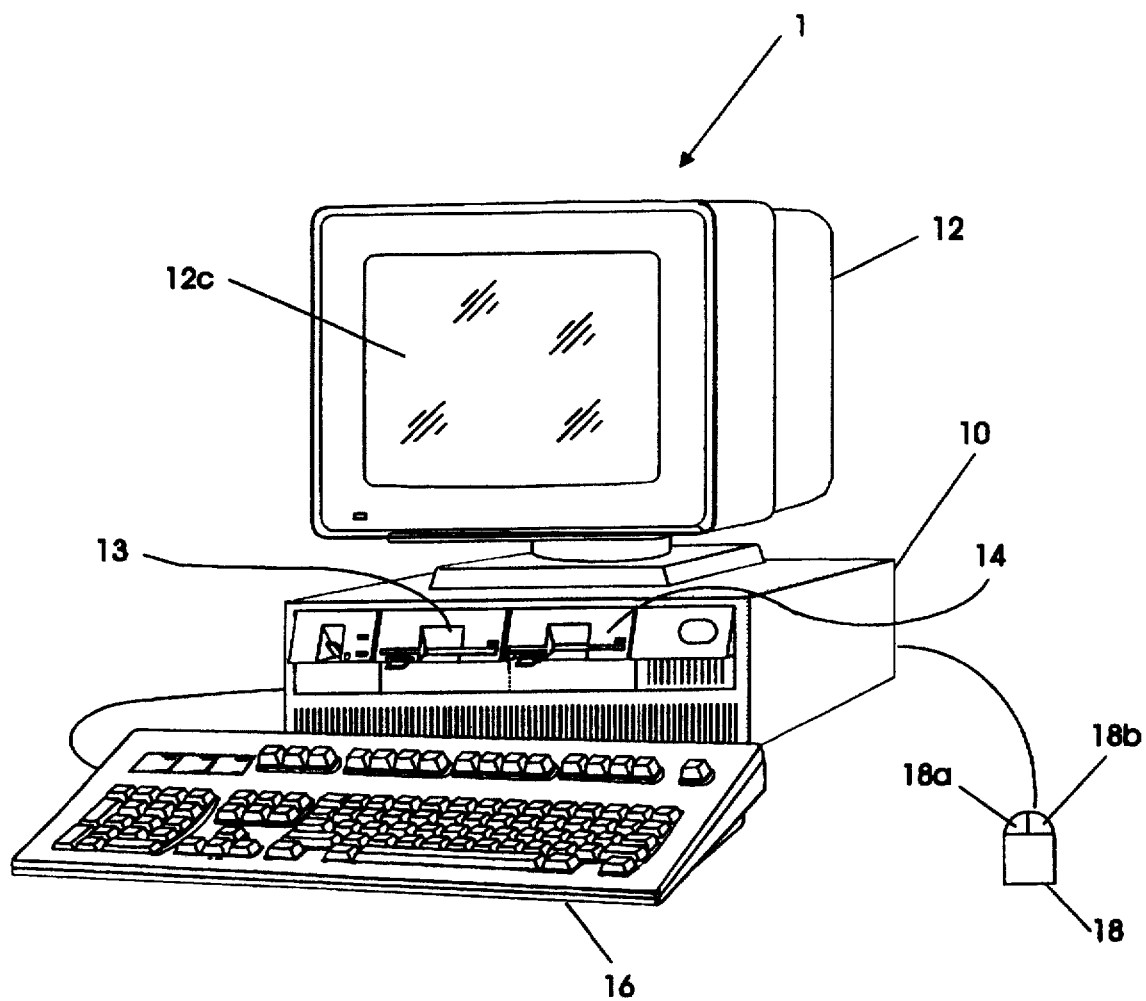
FIG. 1 illustrates a typical computer system which may be employed to practice the novel method and application of the present invention.
Figure 2:
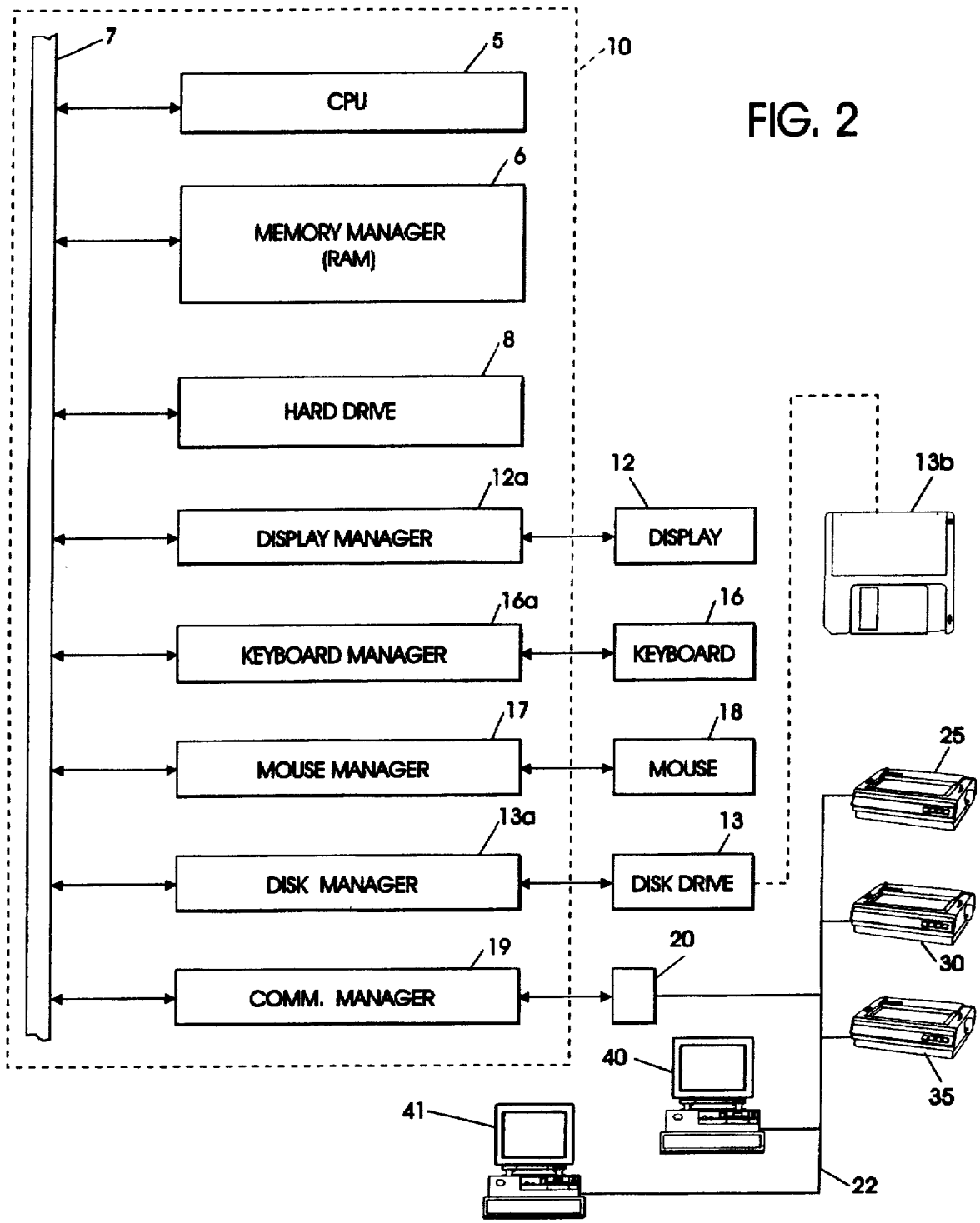
FIG. 2 is a block diagram illustrating a sample configuration of the computer system shown in FIG. 1.

Turning now to the drawings, and especially FIGS. 1 and 2, FIG. 1 diagrammatically shows a computer system 1 which may be connected to a Local Area Network system (LAN 20) as shown in FIG. 2.

As shown in FIG. 1, the computer system 1 comprises a main chassis 10, a display means or monitor 12, a connected keyboard 16 and a pointing device, in the present instance a mouse 18 which is operator controlled to move a pointer cursor 12b (shown in FIG. 3) on the display or monitor screen 12c. As shown in FIG. 2, the chassis 10 includes a central processing unit, or "CPU" 5, a memory manager and associated random access memory, or "RAM" 6, a fixed disk or hard drive 8 (which may include its associated disk controller), a display manager 12a which is connected externally to the chassis 10 of the display 12; a keyboard manager 16a, which through flexible cable (not shown) is connected to the keyboard 16; a mouse manager 17 (which in some instances may form part of the display manager 12a, and may be in the form of a software driver) for reading the motion of the mouse 18 and its control mouse buttons (MB) 18a and 18b, shown in FIG. 1. A disk manager or controller 13a which controls the action of the disk drive 13 (and an optional drive such as a magneto-optical or CD ROM drive 14) shown in FIG. 1, rounds out most of the major elements of the computer system 1.

The pointer element or cursor 12b can be moved over the display screen 12c by movement of the mouse 18. The mouse buttons (MB) 18a and 18b give commands to the operating system (not shown), usually through a software mouse driver provided by the mouse manufacturer. With the first mouse button (MB) 18a the operator can select an element indicated on the display screen 12c using the pointer or cursor 12b, i.e., signify that an action subsequently to be performed is to be carried out on the data represented by the indicated element on the display screen 12c. The operating system normally gives some visual feedback to the operator to indicate that the element has been selected, such as a change in color, or a blocking of the icon. The second mouse button (MB) 18b may be a menu button, if desired. Conventionally, when the operator presses button 18b, a selection menu or dialog with system commands will appear on the display screen 12c. The operator may select an object, icon, or item from the selection menu or input information into the dialog box as appropriate using the cursor 12b and the first mouse button (MB) 18a. Some menu items, if selected, may call up another menu or submenu for the operator to continue the selection process.

The use of a mouse and selection menus is well known in the art, for example U.S. Pat. No. 4,464,652 to Lapson et al. describes a selection menu of the pull-down type in combination with a mouse. It should be recognized, of course, that other cursor pointing devices may be employed, for example a joystick, ball and socket, or cursor keys on the keyboard.

The foregoing devices (and corresponding software drivers) within the chassis 10 communicate with one another via a bus 7. To round out the computer system 1, an operating system (not shown) must be employed. If the computer system is a typical IBM-based system, the operating system may be DOS-based and include a GUI interface such as contained in OS/2®, or WINDOWS®, or other operating system of choice. If the computer system is based upon RISC (reduced instruction set computer) architecture, then the operating system employed may be, in the instance of an IBM-based RISC architectured System/6000®, AIX. Alternatively, if the computer system 1 is a large host computer, such as a an IBM 3090, it may be running an operating system such as MVS or VM. This operating system normally includes a print service facility called PSF, which is a system-wide resource manager, which takes a "job" which has been formatted for a particular printer, and sends certain files, such as fonts, special commands and the like to the printer before sending the file to be printed.

In the illustrated instance, the computer system 1 includes an I/O (Input/Output) manager or communications manager 19 (shown in FIG. 2) which serves to link the computer system for communications with the outside world such as to a systems printer, a modem or a LAN controller (such as a Token ring or ETHERNET or even through a modem employing SDLC) such as shown at 20 in FIG. 2. The LAN controller may be incorporated inside the computer system 1 or located externally as shown diagrammatically in FIG. 2, as desired. The LAN controller 20 may connect to other computer systems 40 and 41 as well as to other printers such as printers 25, 30 and 35 by communications cable 22 and the like.

To aid in understanding the following discussion of the present invention, a short definitions section will be helpful.

| Term: | Definition: |
|---|---|
| Top-Window | The very highest window in a hierarchical window structure. |
| Parent-Window | The next higher window in a hierarchical window structure. A parent-Window could be the Top-Window. |
| Child-Window | The next lower window in a hierarchical window structure. A Child-Window can never be a Top-Window. |
| Window-Title | The fully qualified window name. A Window-Title is composed of a Window-Name and a list of Object-Names. |
| Window-Name | The name of a window (e.g., Program Manager). |
| Object-Name | For a Top-Window, the names of the objects that are contained in (appear in) the Top-Window. For a Child-Window, the names of the Parent-Window objects represented in the Child-Window. |

Figure 3A:
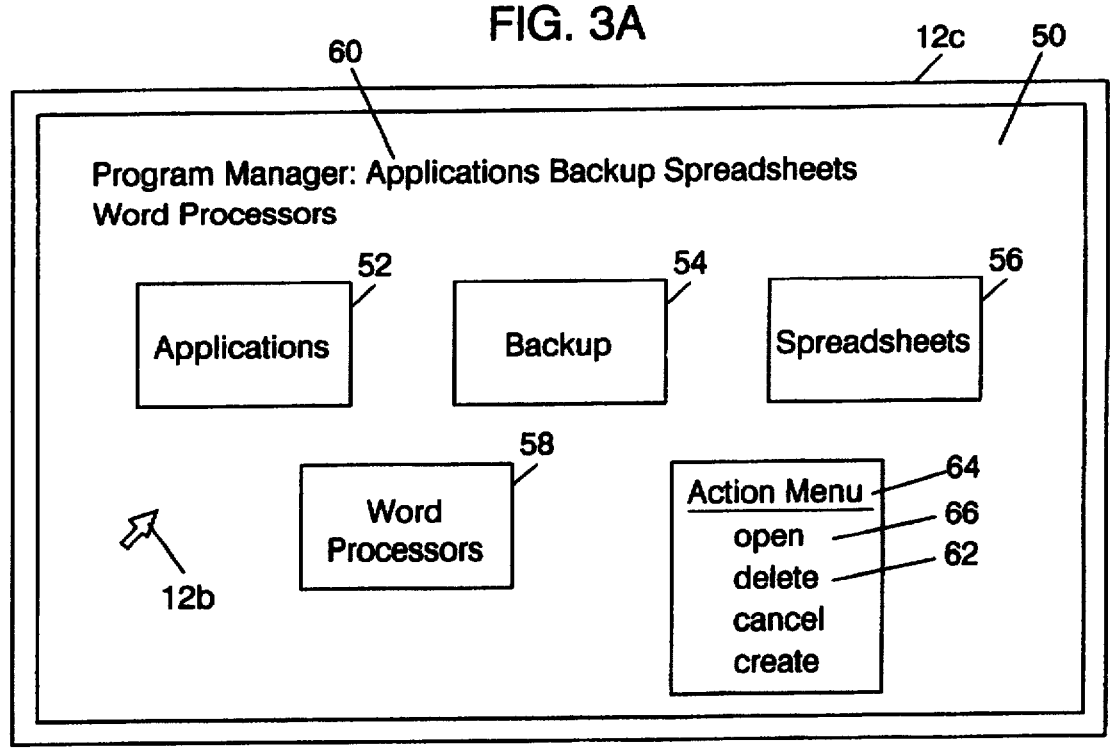
FIG. 3A illustrates a Program Manager window as well as an "Action Menu" dialog with a window title in accordance with the present invention.

Referring now to FIG. 3A, the display screen 12c of the monitor 12 is shown with a program manager dialog window 50 thereon which is similar to the conventional GUI interfaces employed, for example, with the operating systems currently widely used, such as, WINDOWS® or OS/2®. As illustrated, a plurality of example program groups 52, 54, 56, and 58 are shown therein.

Window 50 is a parent window. The objects 52, 54, 56 and 58 are parent objects in that each has related ("child") objects that will appear if the parent object is selected by the user.

As is conventional, when the user desires to open one or more program groups, the mouse 18 is moved until the pointer 12b is in contact with the desired program group. Depending upon the operating system, simply depressing the left mouse button 18b may act to select and open the program group. In other operating systems, rapidly depressing the left mouse button twice selects and opens the program group. In either instance, opening the program group displays in a second window icons therein representative of certain programs which have been collected within the particular program group. Throughout this discussion, however, assume that depressing the mouse button 18a effects the desired action, regardless of whether it takes one or two depressions to accomplish the result.

The title 51 of the window 50 is generated when the window 50 is opened. Since the objects 52, 54, 56, and 58 in Window 50 are parent objects, the title 60 of window 50 is a list of all of the objects the window 50 contains. The words "Program Manager" are the window name. The window name does not change even if the objects in the window change (i.e., are modified, added, or deleted). The window name is followed by a colon. The colon is followed by the window title, which in this example is "Applications Backup Spreadsheets Word Processors." Each object name in the title may be separated by a space or a comma or the like.

Suppose now that the user desires to add, modify, or delete one or more of the objects in Window 50 and, in particular, that the user wants to delete the Word Processors object 58. The user selects the Word Processors object 58. The system indicates the selection by placing a dotted line around object 58. The user then selects "Delete" 62 from the Action Menu 64. The system thus deletes the Word Processor object 58.

In accordance with the invention, more generally, the user selects the objects the user desires to modify, add, append, remove or replace (hereinafter collectively referred to as "modify"), and performs the desired modifications on the selected objects. After the objects are modified, the title of the window 50 will be inaccurate.

The present invention provides a way to update the window title 60, dynamically, while the window is still displayed.

Figure 3B:
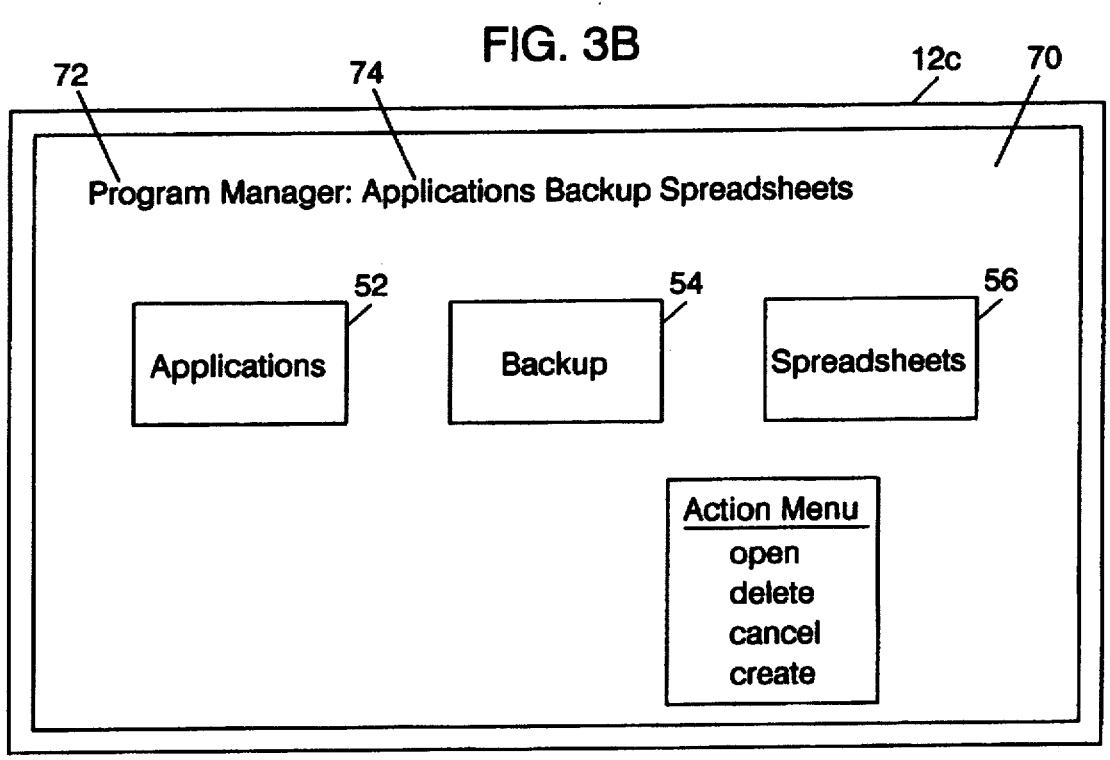
FIG. 3B is a typical screen display illustrating a revised Program Manager window with one object deleted and the title revised accordingly.

As shown in FIG. 3B, the Word Processors object 58 now has been deleted from window 70. The window name 72 "Program Manager" remains the same as in FIG. 3A. The window title 74 now has been modified, however, to remove the name of the deleted object. The revised title 74 is "Application Backup Spreadsheets." The change in the title 60 to the title 74 is done dynamically by the system immediately when object 58 is deleted. There is no need to close and reopen window 50 or window 70 to cause the title 60 to change to the title 74.

Figure 4A:
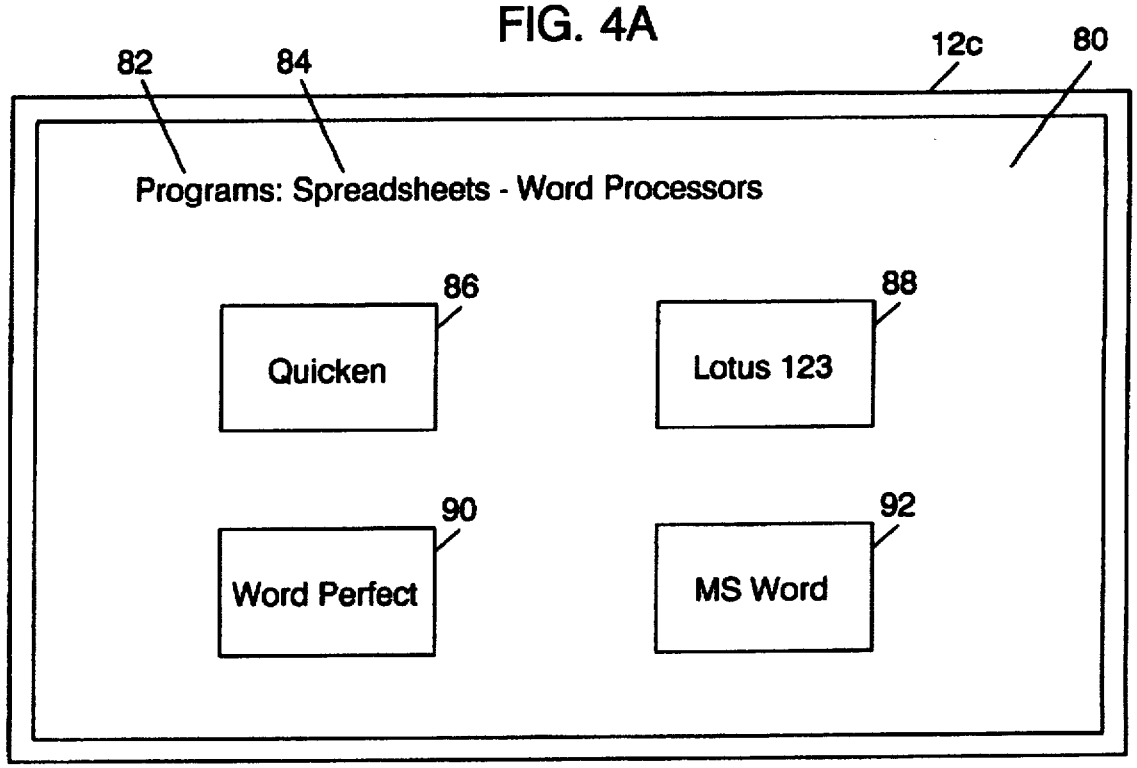
FIG. 4A is a typical screen display illustrating a window of child objects that is titled in accordance with the present invention.

Referring now to FIG. 4A, suppose that the user, when viewing FIG. 3A, decides to select the Spreadsheets object 56 and the Word Processors object 58. The user wants to open both objects and so then selects open 66 in the Action Menu 64. Window 80 shown in FIG. 4A then appears. Window 80 is a child window showing the child objects 86, 88, 90, and 92 related to Spreadsheets object 56 and Word Processors object 58. Object 86 is the icon for the Borland application program called Quicken. Object 88 is the icon for Lotus 123. Object 90 is the icon for WordPerfect, and Object 92 is the icon for Microsoft Word.

In FIG. 4A, the window name 82 is Programs. The window title 84 is a list of the names of the parent objects. In this case, the window title 84 is "Spreadsheets Word Processors."

Figure 4B:
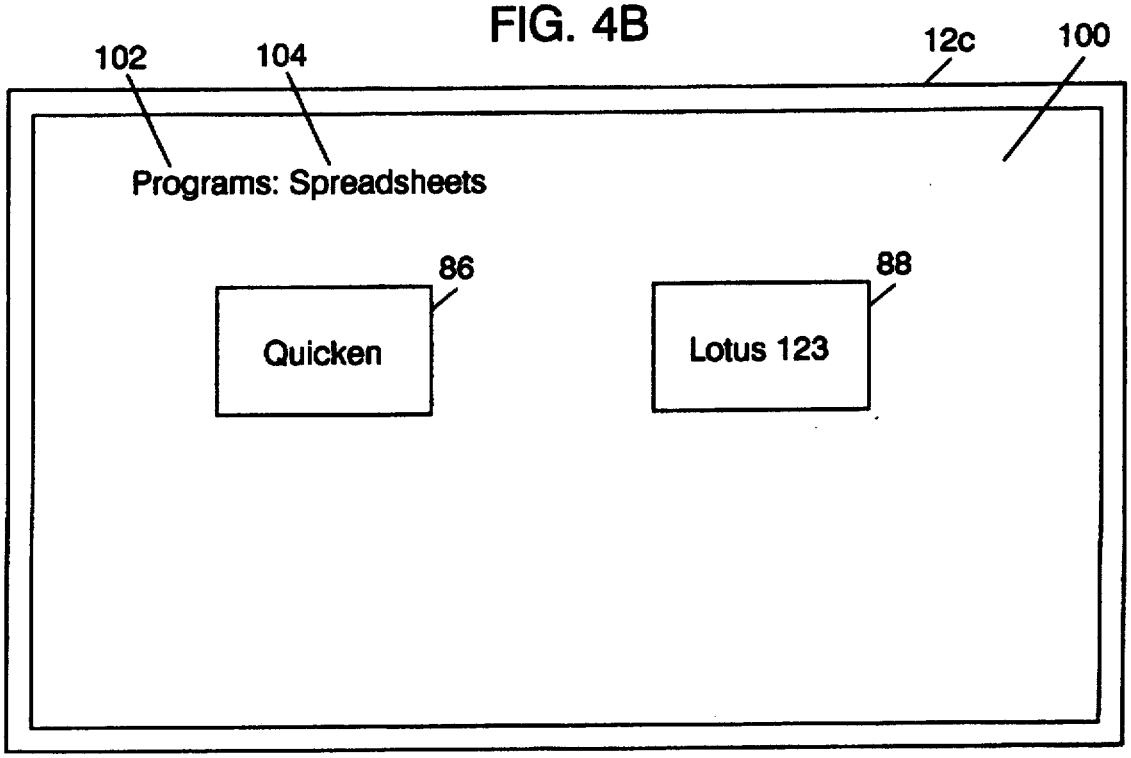
FIG. 4B is a typical screen display illustrating an updated window title for the window in FIG. 4A to correspond to changes in the parent objects.

Now suppose that the user returns to window 50 in FIG. 3A and deletes the Word Processors object 58. The resulting parent window 70 is shown in FIG. 3B. The child window also changes, as shown in FIG. 4B. The child objects 90 and 92 of the parent object Word Processors 58 now also are deleted.

Window 100 in FIG. 4B now shows only the child objects 86 and 88 of Spreadsheets object 56. The window name 102 is the same as in FIG. 4A. The window title 104, however, now has been dynamically modified such that the name of object 58 is no longer in the title 104. The new window title 104 is simply "Spreadsheets."

Figure 5:
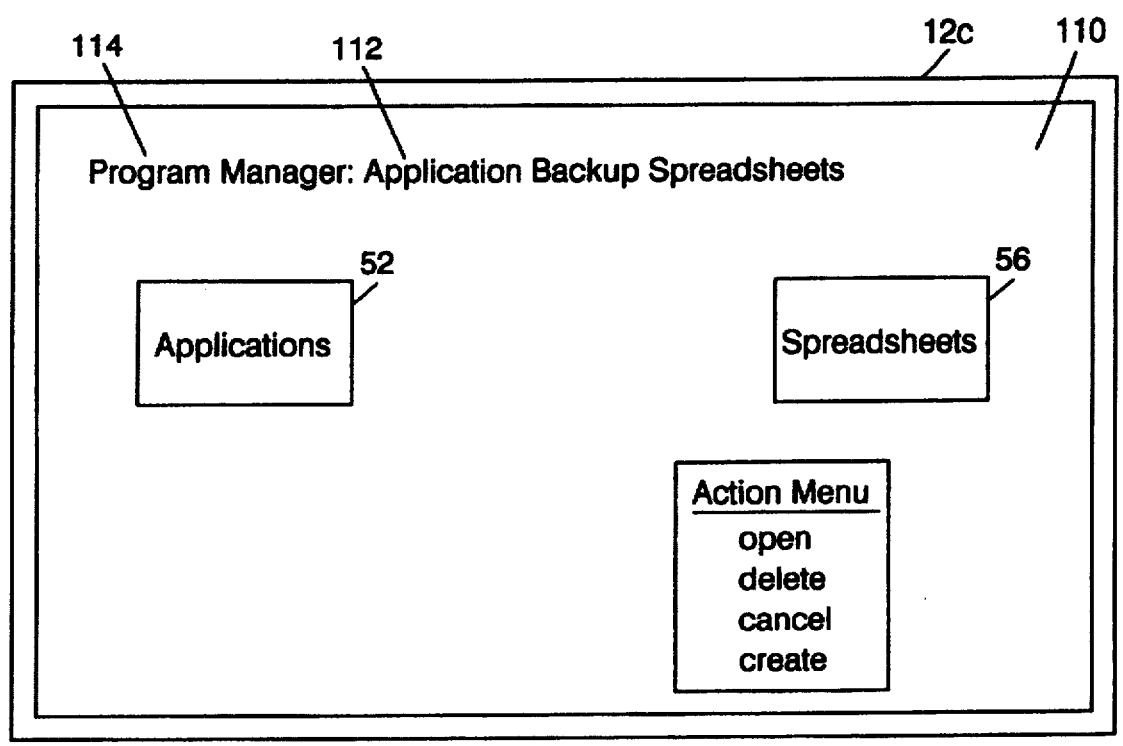
FIG. 5 is a typical screen display illustrating that the title remains the same even though one of the objects in the displayed window has become temporarily unavailable.

As shown in FIG. 5, a further attribute of the invention is that if, for example, one of the objects 52, 54, or 56 shown in FIG. 3B is temporarily unavailable in the system while the window is displayed, the window title remains the same, so that when the unavailable object or icon becomes available, it will appear in the window. In FIG. 4, the unavailable object is backup 54. Yet, this object name remains in the updated title 112 of the window 110. This aspect of the invention thereby avoids undesired and unanticipated changes in the title of the window.

A third attractive feature of the present invention is that an updated title, such as updated title 72 or 104, can be saved so that the next time the window, such as window 70 or 100, is pulled up, it will contain the modified objects.

Figure 6A:
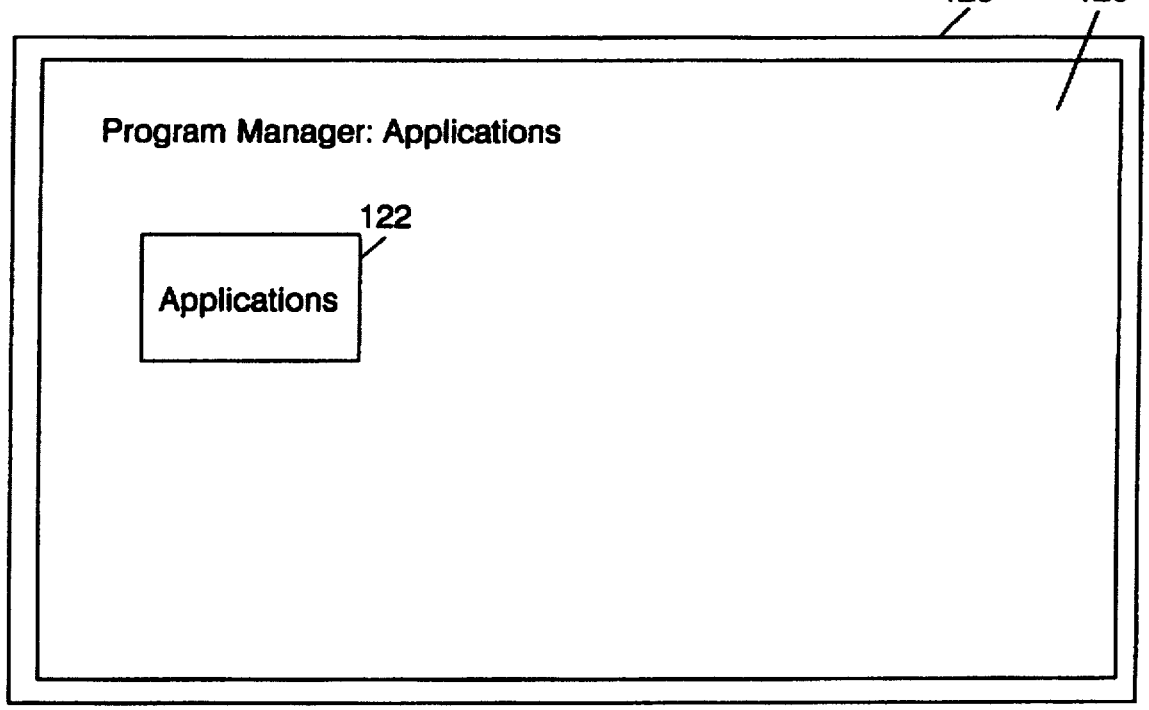
FIG. 6A is a typical screen display showing only one object.
Figure 6B:
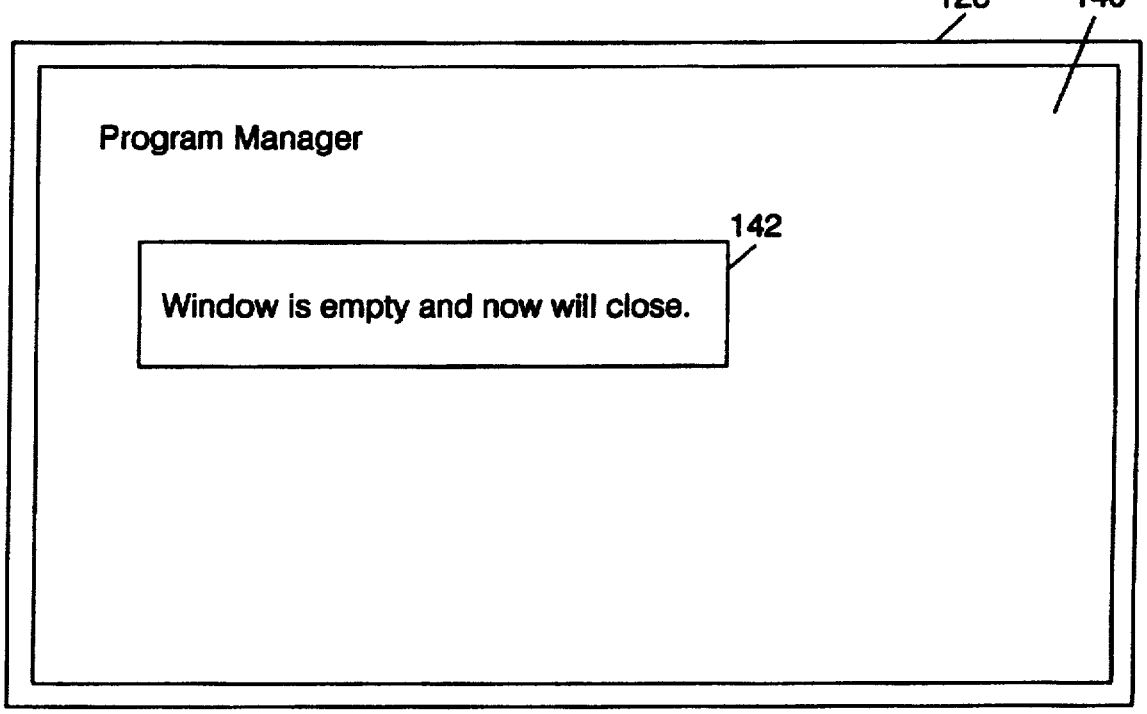
FIG. 6B is a typical screen display illustrating the message generated when a window becomes empty.

As shown in FIGS. 6A and 6B, a fourth useful aspect of the invention is that if there is only one object 122 in a window 120 and that object 122 is deleted, the operating system (not shown) informs the user in message 142 that the window 140 is now empty and that the window 140, therefore, will be closed.

Figure 7B:
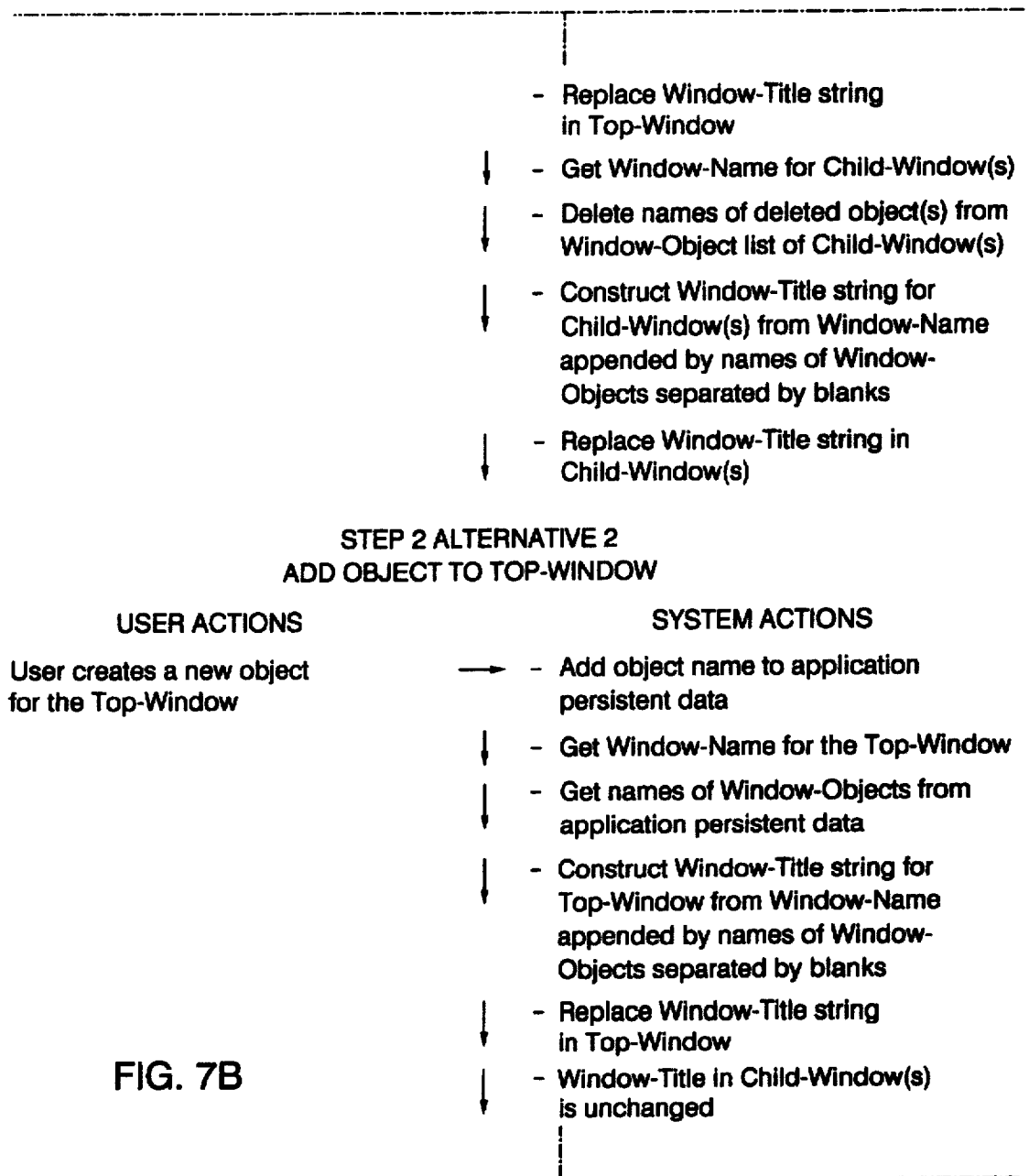
Figure 7C:
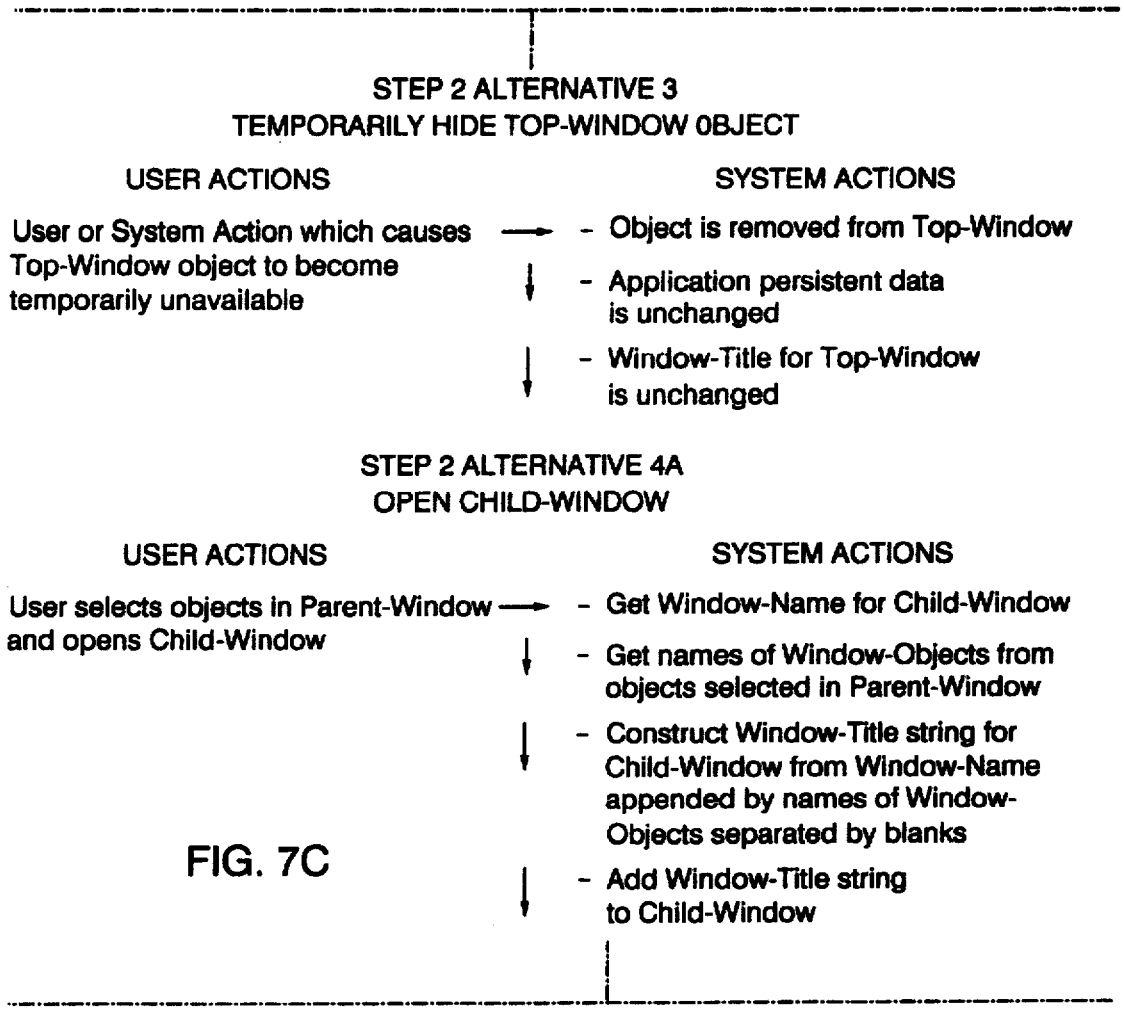

FIG. 7 is a flow chart showing the method of the present invention to dynamically update the title of a window to correspond to changes in the objects of the window. The method is applicable even while the window is displayed.

Although the invention has been described with a certain degree of particularity, it should be recognized that elements thereof may be altered by person(s) skilled in the art with out departing from the spirit and scope of the invention. The invention is limited only by the following claims and their equivalents.

What is claimed is:

1. An application for revision of a title of a window containing parent objects as controlled by a computer system having at least a visual operator interface, an operating system for controlling the operation of program applications within the computer system, and memory for storing a program application, the application comprising:

means for generating a title of the window comprising a list of all of the parent objects in the window;

means for designating objects in the window to be altered, modified, added or deleted (collectively "modified");

means for modifying the designated objects; and means for dynamically revising the title of the window while the window continues to be displayed to correspond to the modifications of the designated objects.

2. An application for revision of a title of a window containing parent objects in accordance with claim 1, further comprising means for retaining in the title the name of a parent object in the window even if the parent object becomes temporarily unavailable while the window is displayed.

3. An application for revision of a title of a window containing parent objects in accordance with claim 1, further comprising means for saving the revised title so that when the window is opened again in the future, the modified objects will appear in the window.

4. An application for revision of a title of a window containing parent objects in accordance with claim 1, further comprising means for closing the window if all of the objects in the window are deleted.

5. An application for revision of a title of a window containing parent objects as controlled by a computer system having at least a visual operator interface, an operating system for controlling the operation of program applications within the computer system, and memory for storing a program application, the application comprising:

means for generating a title of the window comprising a list of all of the parent objects in the window;

means for designating objects in the window to be altered, modified, added or deleted (collectively "modified");

means for modifying the designated objects;

means for dynamically revising the title of the window while the window continues to be displayed to correspond to the modifications of the designated objects; and means for retaining in the title the name of a parent object in the window even if the object becomes temporarily unavailable while the window is displayed.

6. An application for revision of a title of a window containing parent objects as controlled by a computer system having at least a visual operator interface, an operating system for controlling the operation of program applications within the computer system, and memory for storing a program application, the application comprising:

means for generating a title of the window comprising a list of all of the parent objects in the window;

means for designating objects in the window to be altered, modified, added or deleted (collectively "modified");

means for modifying the designated objects;

means for dynamically revising the title of the window while the window continues to be displayed to correspond to the modifications of the designated objects; and means for saving the revised title so that when the window is opened again in the future, the modified objects will appear in the window.

7. An application for revision of a title of a window containing parent objects as controlled by a computer system having at least a visual operator interface, an operating system for controlling the operation of program applications within the computer system, and memory for storing a program application, the application comprising:

means for generating a title of the window comprising a list of all of the parent objects in the window;

means for designating objects in the window to be altered, modified, added or deleted (collectively "modified");

means for modifying the designated objects;

means for dynamically revising the title of the window while the window continues to be displayed to correspond to the modifications of the designated objects; and means for closing the window if all of the objects are deleted.

8. An application for revision of a title of a window containing parent objects as controlled by a computer system having at least a visual operator interface, an operating system for controlling the operation of program applications within the computer system, and memory for storing a program application, the application comprising:

means for generating a title of the window comprising a list of all of the parent objects in the window;

means for designating objects in the window to be altered, modified, added or deleted (collectively "modified");

means for modifying the designated objects;

means for dynamically revising the title of the window while the window continues to be displayed to correspond to the modifications of the designated objects;

means for retaining in the title the name of a parent object in the window even if the object becomes temporarily unavailable while the window is displayed;

means for saving the revised title so that when the window is opened again in the future, the modified objects will appear in the window; and means for closing the window if all of the objects are deleted.

9. An application for revision of a title of a window containing child objects as controlled by a computer system having at least a visual operator interface, an operating system for controlling the operation of program applications within the computer system, and memory for storing a program application, the application comprising:

means for generating a title of the window comprising a list of names of each parent object represented by one or more child objects in the window;

means for modifying one or more of the parent objects; and means for dynamically revising the title of the window containing child objects while the window continues to be displayed to correspond to the modifications of the parent objects.

10. An application for revision of a title of a window containing child objects in accordance with claim 9, further comprising means for retaining in the title the name of a parent object even if the parent object becomes temporarily unavailable while the window is displayed.

11. An application for revision of a title of a window containing child objects in accordance with claim 9, further comprising means for saving the revised title so that when the window is opened again in the future, the objects will appear in the window.

12. An application for revision of a title of a window containing child objects in accordance with claim 9, further comprising means for closing the window if all of the objects in the window are deleted.

13. An application for revision of a title of a window containing parent objects as controlled by a computer system having at least a visual operator interface, an operating system for controlling the operation of program applications within the computer system, and memory for storing a program application, the application comprising:

means for generating a title of the window comprising a list of names of each parent object represented by one or more child objects in the window;

means for modifying one or more of the parent objects; and means for dynamically revising the title of the window containing child objects while the window continues to be displayed to correspond to the modifications of the parent objects.

14. An application for revision of a title of a window containing parent objects as controlled by a computer system having at least a visual operator interface, an operating system for controlling the operation of program applications within the computer system, and memory for storing a program application, the application comprising:

means for generating a title of the window comprising a list of names of each parent object represented by one or more child objects in the window;

means for modifying one or more of the parent objects; and means for dynamically revising the title of the window containing child objects while the window continues to be displayed to correspond to the modifications of the parent objects;

means for saving the revised title so that when the window is opened again in the future, the objects will appear; and means for closing the window if all of the objects are deleted.

15. A method for revision of a title of a window containing parent objects as controlled by a computer system having at least a visual operator or interface, an operating system for controlling the operation of program applications within the computer system, and memory for storing a program application, the method comprising the steps of:

generating a title of the window comprising a list of all of the objects in the window;

designating objects in the window to be altered, modified, added or deleted (collectively "modified");

modifying the designated objects; and revising the title of the window while the window continues to be displayed to correspond to the modifications of the objects.

16. A method for revision of the value of a title of a window containing objects in accordance with claim 15 further comprising the step of retaining in the title the name of an object in the window even if the object becomes temporarily unavailable while the window is displayed.

17. A method for revision of the value of a title of a window containing objects in accordance with claim 15 further comprising the step of saving the revised title so that when the window is pulled up again in the future, the modified objects will appear in the window.

18. A method for revision of the value of a title of a window containing objects in accordance with claim 15 further comprising the step of closing the window if all of the objects are deleted.

19. A method for revision of a title of a window containing objects as controlled by a computer system having at least a visual operator or interface, an operating system for controlling the operation of program applications within the computer system, and memory for storing a program application therein, said method comprising the steps of generating a title of the window comprising a list of names of each parent object represented by one or more child objects in the window;

modifying one or more of the parent objects; and dynamically revising the title of the window containing child objects while the window continues to be displayed to correspond to the modifications of the parent objects; and retaining in the title the name of an object in the window even if the object becomes temporarily unavailable while the window is displayed.

20. A method for revision of a title of a window containing objects as controlled by a computer system having at least a visual operator or interface, an operating system for controlling the operation of program applications within the computer system, and memory for storing a program application therein, said method comprising the steps of generating a title of the window comprising a list of names of each parent object represented by one or more child objects in the window;

modifying one or more of the parent objects;

dynamically revising the title of the window containing child objects while the window continues to be displayed to correspond to the modifications of the parent objects; and saving the revised title so that when the window is pulled up again in the future, the modified objects will appear in the window.

21. A method for revision of a title of a window containing objects as controlled by a computer system having at least a visual operator or interface, an operating system for controlling the operation of program applications within the computer system, and memory for storing a program application therein, said method comprising the steps of:

means for generating a title of the window comprising a list of names of each parent object represented by one or more child objects in the window;

means for modifying one or more of the parent objects; and means for dynamically revising the title of the window containing child objects while the window continues to be displayed to correspond to the modifications of the parent objects.

22. A method for revision of a title of a window containing objects as controlled by a computer system having at least a visual operator or interface, an operating system for controlling the operation of program applications within the computer system, and memory for storing a program application therein, said method comprising the steps of generating a title of the window comprising a list of names of each parent object represented by one or more child objects in the window;

modifying one or more of the parent objects; and dynamically revising the title of the window containing child objects while the window continues to be displayed to correspond to the modifications of the parent objects.

* * * * *